United States Patent [19]
McFarlane et al.

[11] Patent Number: 5,200,955
[45] Date of Patent: Apr. 6, 1993

[54] REPEATER FOR TDMA MOBILE RADIO

[75] Inventors: David A. McFarlane, Saxmundham; John R. Ball, Woodbridge, both of England

[73] Assignee: British Telecommunications public limited company, Great Britain

[21] Appl. No.: 601,702
[22] PCT Filed: Apr. 19, 1989
[86] PCT No.: PCT/GB89/00413
§ 371 Date: Oct. 3, 1990
§ 102(e) Date: Oct. 3, 1990
[87] PCT Pub. No.: WO89/10660
PCT Pub. Date: Nov. 2, 1989

[30] Foreign Application Priority Data
Apr. 22, 1988 [GB] United Kingdom ............. 8809602

[51] Int. Cl.⁵ .................................................. H04B 3/36
[52] U.S. Cl. ............................................ 370/97; 370/75; 455/18
[58] Field of Search .............. 370/97, 75, 50; 455/11, 455/38, 18

[56] References Cited
U.S. PATENT DOCUMENTS
4,152,647  5/1979  Gladden et al. ............... 455/38
4,490,818 12/1984  Otsuka ............................ 455/18
4,713,809 12/1987  Mizota ............................ 370/97

Primary Examiner—Curtis Kuntz
Assistant Examiner—T. Ghebretinsae
Attorney, Agent, or Firm—Nixon & Vanderhye

[57] ABSTRACT

A repeater for enhancing performance of a TDMA mobile radio system in poor signal areas has a bank of frequency agile, single channel amplifiers (13), and controller (14). The controller (14) scans the channel of the band and, upon identifying a channel carrying traffic, enables one of the amplifier units (13) to operate on that channel. Each of the amplifier units (13) includes a time slot activity detector (35) for detecting which time slot of a channel is active. The output of the activity detector (35) is passed to a logic control module (36), which controls the amplification of an active time slot via a time slot gate and power unit (38).

14 Claims, 5 Drawing Sheets

REPEATER FOR TDMA MOBILE RADIO

BACKGROUND

I. Field of the Invention

This invention relates to a mobile radio system, and in particular to a radio repeater (cell enhancer) for a digital time-division-multiple-access (TDMA) mobile radio system.

II. Prior Art and other Considerations

In a mobile radio system, there often exist areas of poor coverage within the service area of a base station, where poor signal reception by the base station from a mobile (and vice versa) results in unacceptable voice quality, or even the total loss of a call. One solution to this problem is the provision of a wideband repeater or re-radiator. This however suffers from certain disadvantages, viz (i) it would re-radiate all signals within the frequency range covered-including unwanted signals, for example from other radio systems which may be using the band; (ii) intermodulation and wideband noise; and (iii) the power level of each channel within the band would be amplified by an equal amount regardless of the actual signal strength.

A radio repeater is known (see the specification of our co-pending EP patent application no. 0274857) which utilizes a plurality of frequency-agile single-channel amplifier units for amplifying only traffic-carrying channels. This repeater is an analogue frequency-division-multiple-access (FDMA) system, and so is not suitable for digital systems such as the proposed pan-European GSM (Groupe Speciale Mobile) mobile radio system.

SUMMARY

The present invention provides a radio repeater for a frequency band having a plurality of RF channels for carrying a plurality of digital TDMA channels each having a sequence of time slots, comprising: a plurality of single RF-channel amplifier units; and control means for scanning the RF channels to identify an active RF channel and for assigning one of the amplifier units to an identified active channel, characterised in that each of the amplifier units has means for identifying an active time-slot of a TDMA channel, within an active RF channel, and for amplifying digital signals in that time slot.

Advantageously, each amplifier unit has, for duplex operation, forward and reverse amplifying paths, and the number of amplifier units is smaller than the number of the RF channels, the amplifier units being of selectable frequency, and the control means being arranged, in use, to select the frequency of each unit for assignment to an active channel.

In one preferred embodiment, each amplifier unit has, in each amplifying path, a first frequency changer for converting input signals down to an intermediate frequency, a band-pass filter, and a second frequency changer for converting the filtered signals up to the original frequency, the filter frequency being fixed, and the channel assignment of the unit being controllable by controlling the frequency changer local oscillator frequency. Conveniently, the intermediate frequencies for the forward and reverse paths of an amplifier unit differ by an amount corresponding to the transmit-receive frequency spacing of the speech channels, whereby a single local oscillator may be used for the unit. Preferably, the control means is common to all the amplifier units.

In another preferred embodiment, each amplifier unit has, in each amplifying path, a frequency changer for converting input signals to an intermediate frequency, a band-pass filter, a frequency discriminator for demodulating the digital signal, a regenerator for the recovered digital signal, a modulator driven by the regenerated digital signal and operating at the original frequency, the channel assignment of the unit being controllable by controlling the local oscillator frequencies supplied by the frequency changer and the modulator. The output of the modulator is amplified to produce the output of the amplifier unit.

Alternatively, the frequency changer may comprise two mixers both supplied with the input signal, the local oscillator for each mixer being at the same frequency but with a relative phase displacement of 90 degrees, with the local oscillator frequency being nominally the same as the signal frequency. The resulting two signals from the mixers are processed at baseband to derive a regenerated replica of the digital modulation, preferably by digital signal processing techniques. The processing includes low-pass filtering. The regeneration process produces two signals which are applied to two modulators driven by the same local oscillator as the frequency changer, and with a relative phase displacement of 90 degrees. The outputs of the two modulators are combined and amplified to produce the output of the amplifier unit.

Advantageously, the time slot identification means comprises a time slot activity detector for detecting which time slot of a channel is active, a control unit which receives the output of the time slot activity detector, and a time slot gate and power control unit which is controlled by the control unit so as to amplify only an active time slot. In this case, each amplifier unit may further comprise a clock recovery, synchronisation and time slot detector unit for deriving a system clock, synchronisation pulses and time slot strobes and applying these to the control unit.

Preferably, the control unit of each amplifier unit includes means for controlling the operating frequency of the enabled amplifier unit to follow a predetermined frequency hopping sequence, thereby allowing the repeater to be used in radio systems which employ frequency hopping. Conveniently, the frequency control means of a given amplifier unit is effective to control the first and second frequency changers or modulators of that amplifier unit.

BRIEF DESCRIPTION OF THE DRAWINGS

A radio repeater constructed in accordance with the invention, will now be described, by way of example, with reference to the accompanying drawings, in which.

DETAILED DESCRIPTION OF THE DRAWINGS

Figure 1:
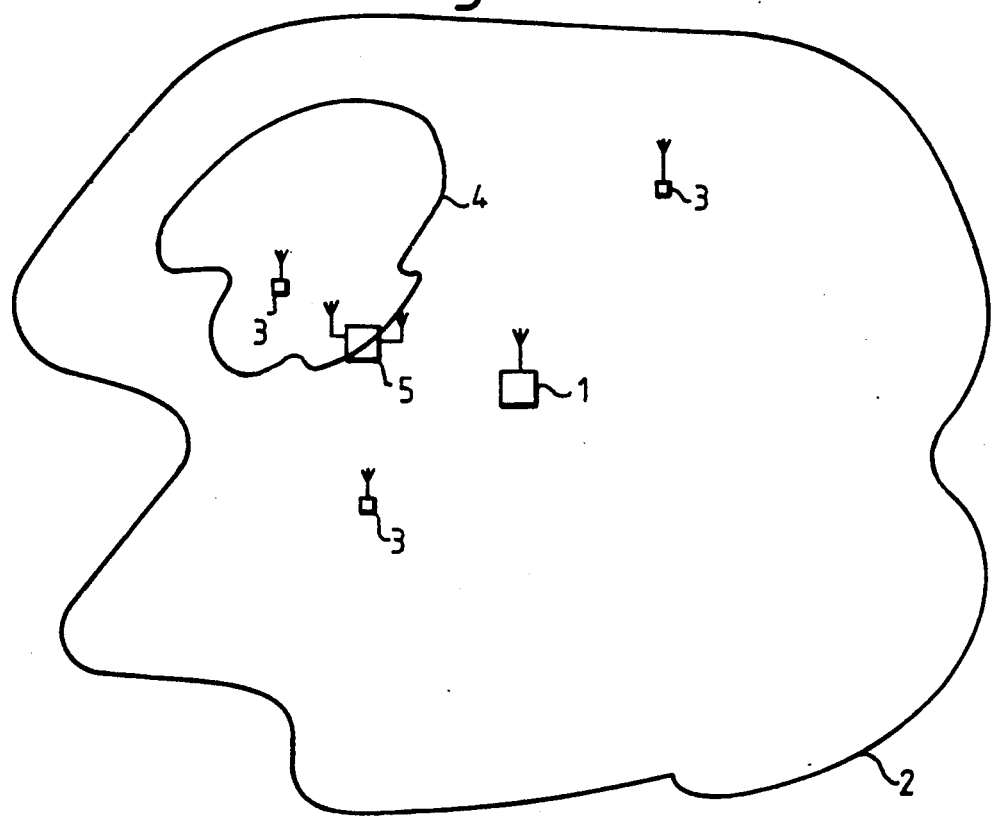
FIG. 1 shows schematically a mobile radio area.

Referring to the drawings FIG. 1 illustrates schematically a mobile radio system, in which a base station 1 serves an area 2—perhaps one "cell" of a cellular radio system for two-way speech communication with a number of mobile units 3. It is assumed that, within a given frequency band, duplex radio channels, namely a control or signalling channel and a number of speech channels, are allocated for communication between the base station 1 and the mobile units 3 within the area 2. Owing (for example) to the nature of the terrain, there exists within the area 2 a poor coverage area 4. The quality of communication between the base station 1 and the mobile units 3 within this area 4 is unsatisfactory, and a fixed repeater 5 is provided at a location such that it can achieve satisfactory radio communication both with the base station and with the mobile units within the poor coverage area.

Figure 2:
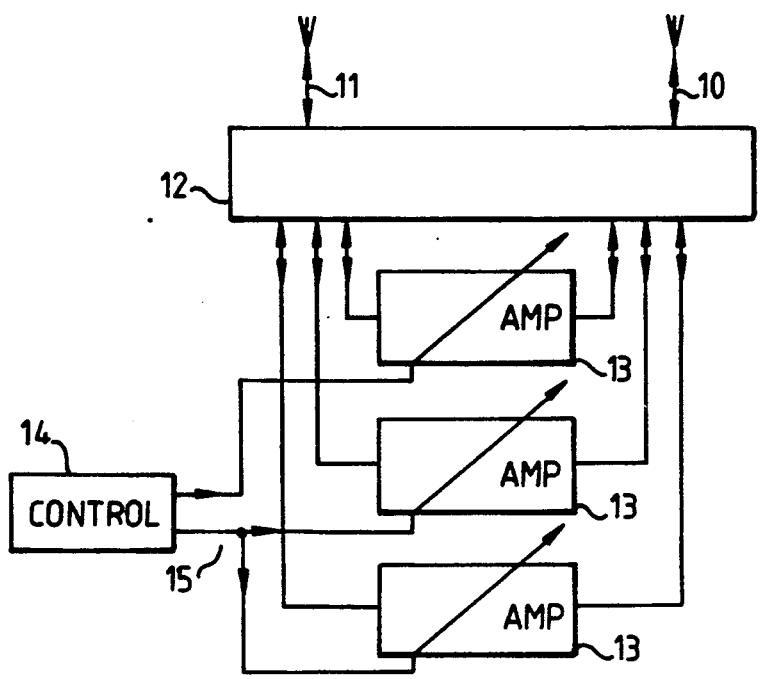
FIG. 2 is a block diagram of the repeater.

FIG. 2 illustrates the repeater 5 which has, in outline, an antenna 10 for communication with the base station 1, and an antenna 11 for communication with the mobile units 3 within the poor coverage area 4. Between the two antennas 10 and 11 are connected, via a radio frequency (RF) module 12, a number (three only of which are shown) of duplex, single-channel amplifier modules 13. The number of modules 13 is less than the number of channels allocated for the radio area 2, and a control unit 14 is provided for channel allocation. The control unit 14 scans the allocated channels to identify those which are in use, and switches the amplifier units 13 to the appropriate channels.

The scanning function may be performed by one or more of the amplifier units under the control of the control unit (14).

Figure 3:
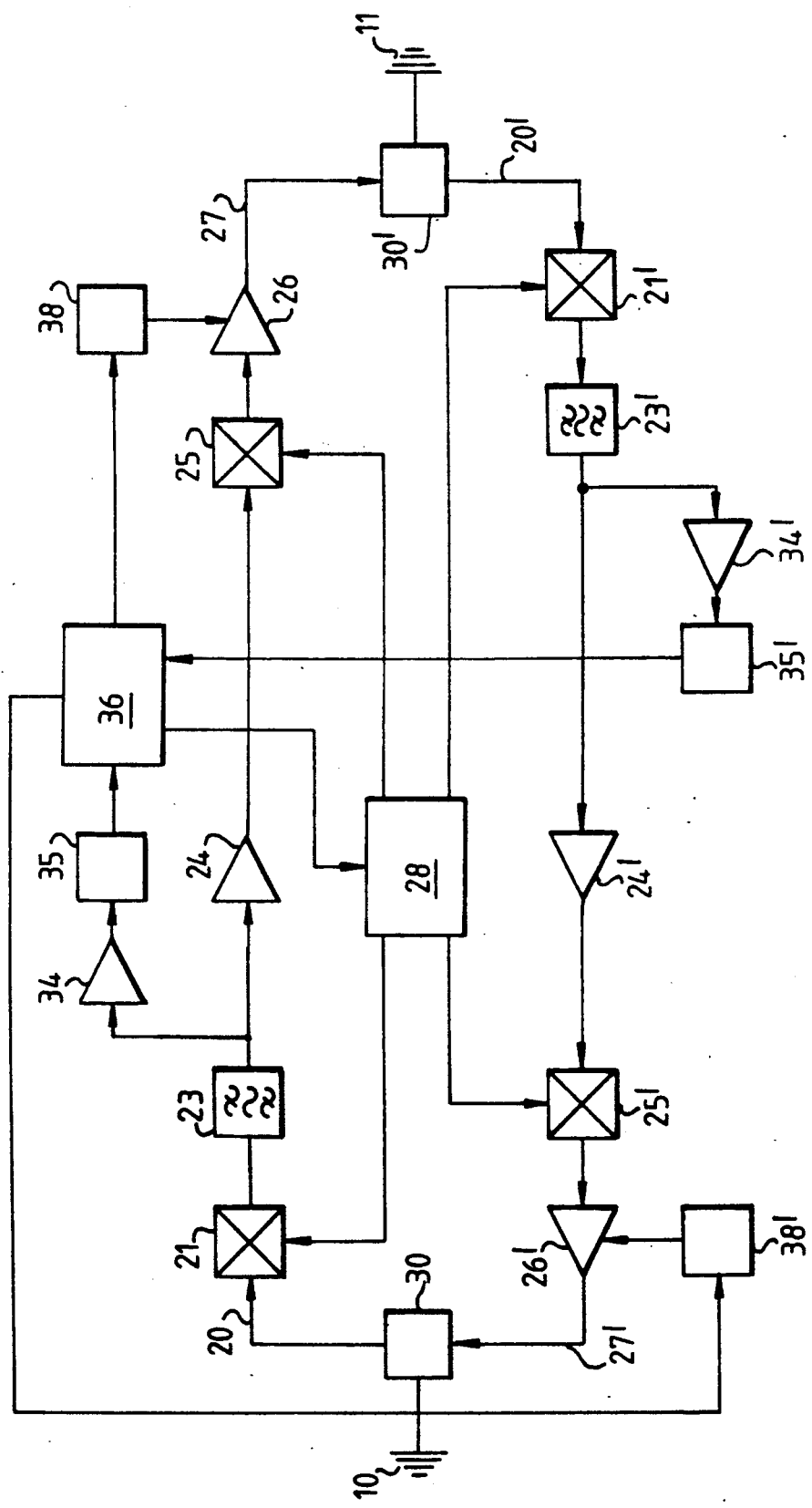
FIG. 3 is a block diagram of one amplifier unit of the repeater of FIG. 2.

An amplifier module 13 is shown in FIG. 3. In order to achieve the selectivity required for channel selection, incoming signals are converted down to an intermediate frequency (IF), filtered and up-converted. Though not in principle essential, the frequency of re-radiation is the same as that of the received signals, to avoid the necessity of requiring the mobile unit 3 (or the base station 1) to change frequency.

In FIG. 3, the signal received at an input 20 from the base station 1 is down-converted in a mixer 21 to an intermediate frequency of (for example) 45 MHz, and the desired channel is filtered in a band-pass filter 23 and amplified by amplifier 24. It is then up-converted to the original frequency (by a mixer 25), amplified in a power amplifier 26, and supplied to an output 27 for retransmission to the poor coverage area 4. This base-to-mobile transmission direction is known as a downlink. The mobile-to-base transmission direction (the uplink) is treated similarly by units 20' to 27', except that (assuming a transmit-receive frequency spacing of 45 MHz) a 90 MHz I.F. is chosen, so that a single output from a local oscillator 28 can be used to supply all four mixers 21, 25, 21', 25'. The I.F. filters 23, 23' are fixed frequency, and channel selection is effected by controlling the frequency of the local oscillator 28. The oscillator 28 is a conventional frequency synthesiser capable of being switched, via a control bus 15 (see FIG. 2) from the control unit 14, to frequencies such that the I.F. filters 23, 23' select any of the allocated channels. Similarly, the control unit 14, via the bus 15, can control the amplifier 13, turning the individual time slots on or off, and setting the output signal level to a value derived by the control unit 14 from the incoming signal.

Figure 4:
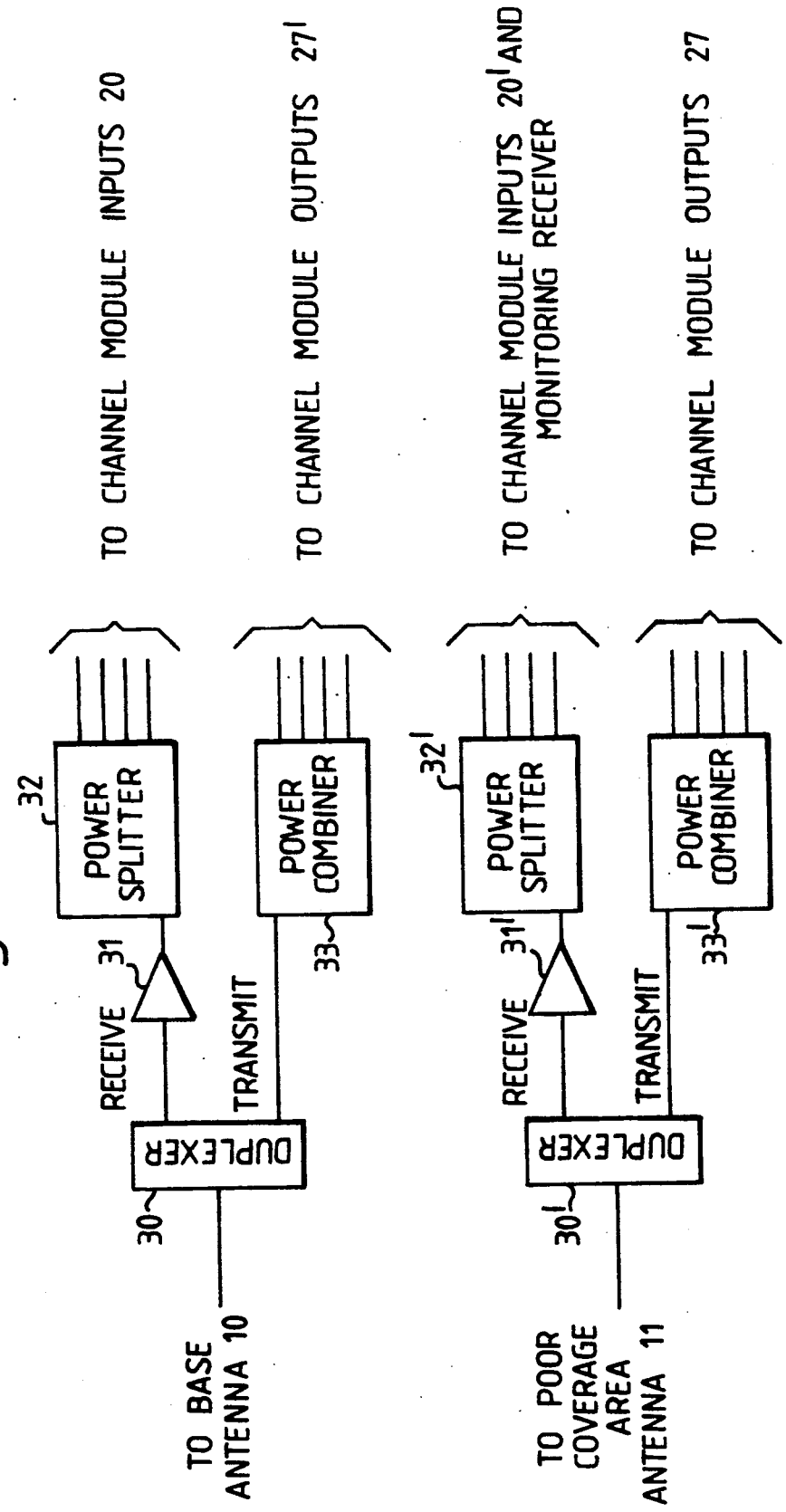
FIG. 4 is a block diagram of the RF module of the repeater of FIG. 2.

The RF module 12 is shown in FIG. 4. The "base" antenna 10 is connected via a duplexer 30 to (a) a receive preamplifier 31 and a power splitter 32 which feeds the module inputs 20 (and, if required, the control unit 14), and (b) a passive power combiner 33 which receives the module outputs 27'. Similar components 30' to 33' interface the "mobiles" antenna 11 to the module inputs 20' and outputs 27. In an alternative embodiment (not shown), separate antennas 10 and 11 could be used for each amplifier module 13.

The architecture of control unit 14 can be conventional and will not, therefore, be described in detail.

In the present embodiment of the invention, the function of the control unit 14 is to determine to which frequencies the channel modules 13 should be switched. The control unit is programmed with a set of channel frequencies on which the repeater may operate. When a signal in a time-slot on any of these channels meets certain predetermined conditions, the channel is judged to be in use. If a channel module is available, it will be switched on to amplify that time-slot in that channel. The conditions for determining the in-use state may include signal strength, signal to noise ratio, and quality of the digital modulation.

Programming of the control unit may be by manual means, for example switches or keypad attached to the unit, or remotely via an appropriate communications interface, or by resident internal program.

Where the repeater is equipped with fewer channel modules than the number of frequency channels on which it is programmed to operate, then during periods in which one or more channel modules are not occupied in amplifying, they may be used to scan the remaining relevant channels for activity. Alternatively, a dedicated scanning receiver module may be used for this purpose.

In the cellular system, the channels to scan will consist of one control and signalling channel and a number of speech channels (the control and signalling channel is used for registration of mobile transmitters onto the cellular system, for setting up telephony calls, and for other control purposes such as initiating frequency hopping sequences).

For a TDMA mobile radio system, each mobile unit 3 is allocated a given time slot in the time domain by the base station 1. This time slot allocation is carried out during the call set-up procedure. Typically, the time domain has eight time slots, which effectively means that the repeater 5 can handle eight times as many mobile units 3 as there are channels.

As shown in FIG. 3, the antennas 10 and 11 are connected to each of the duplex amplifier units 13 via duplexers 30 and 30'. The duplexers 30 and 30' are common to all the amplifier units 13, and form part of the RF module 12. In an alternative embodiment which utilises separate antennas 10 and 11 for each amplifier 13, time switches could be used instead of the duplexers 30 and 30'.

Once an amplifier unit is assigned to an operating channel, the received signals on the downlink are intercepted and amplifier by amplifier 34 and passed to the demodulator and level detector 35, which also derives time-slot timing information. A similar function on the uplink is performed by amplifier 34' and demodulator and level detector 35'.

The control logic module 36 uses the signal level and time-slot timing information from 35 and 35' to control the transmitted power levels in the relevant time-slots of downlink and uplink, via the time-slot gate and power controllers 38 and 38', so as to amplify only signals in the relevant time-slots.

It should be noted that the time-slots proper to a given mobile have a relative time displacement between uplink and downlink of several time-slots.

Figure 5:
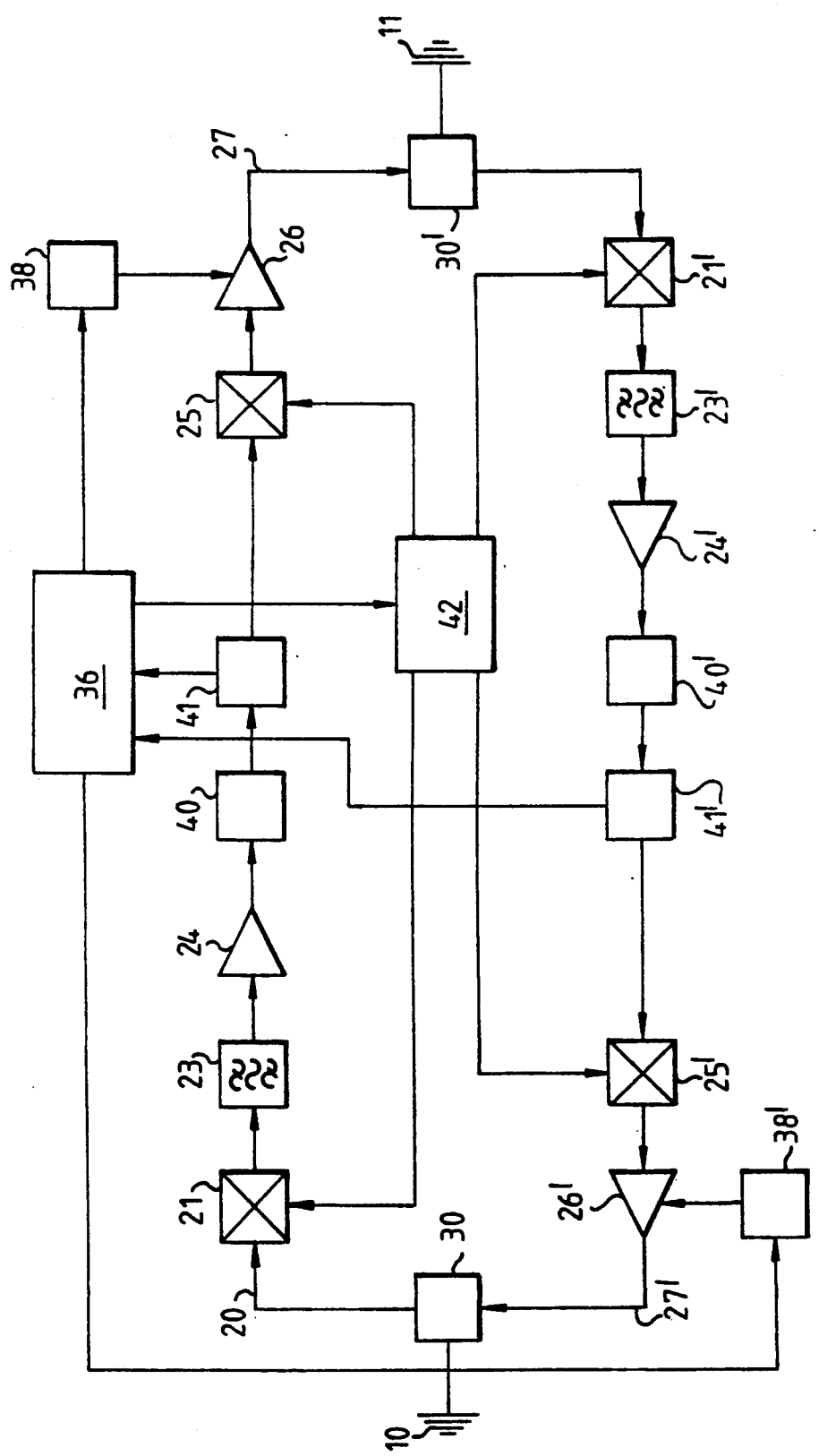
FIG. 5 is a block diagram of an alternative embodiment of one amplifier unit of the repeater of FIG. 2.

FIG. 5 illustrates schematically an alternative embodiment of an amplifier module 13, in which the received signal at input 20 is down-converted in a mixer 21 to an intermediate frequency of (for example) 45 MHz, and the desired channel is filtered by a band-pass filter 23 and amplified by amplifier 24. The signal is then demodulated by demodulator 40 and the digital modulating signal is regenerated in regenerator 41, which also derives signal level and time-slot timing information for the control logic module 36. The recovered digital signal is applied to modulator 25 to produce a replica of the oringinal singal, which is amplifier in amplifier 26 and supplied to an output 27 for retransmission. The othe direction of transission is treated similarly in units 21' to 245', 40', 41', 25' and 26'.

Figure 6:
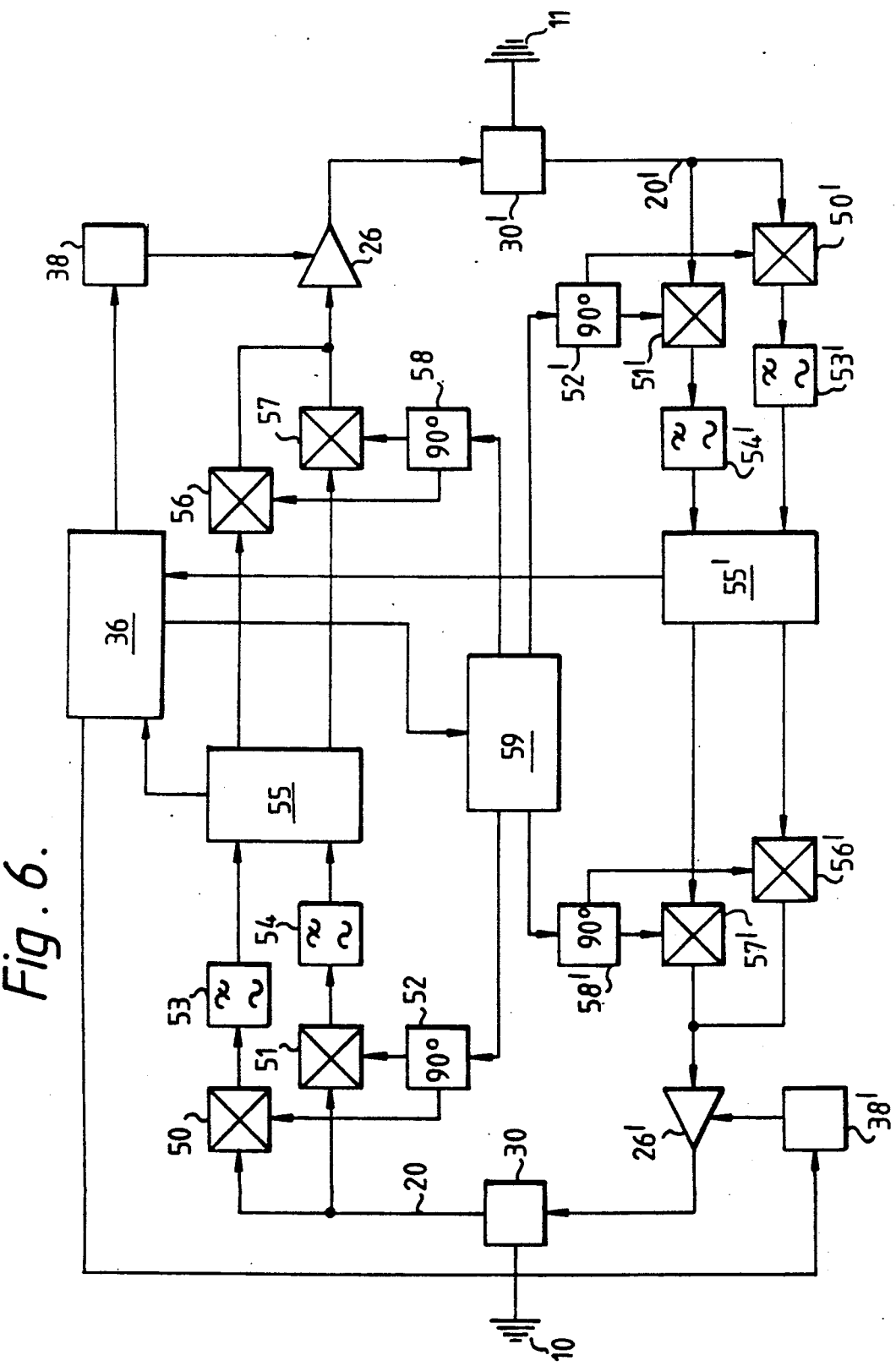
FIG. 6 is a block diagram of another alternative embodiment of one amplifier unit of the repeater of FIG. 2.

FIG. 6 illustrates yet another alternative embodiment of an amplifier module 13, in which the received signal at input 20 is applied to two mixers 50 and 51, the local oscillator for each mixer being at the npominal center frequency of the channel to be amplified. The local oscillator supplies to the two mixers are displaced in phase by 90 degrees in order to operate the mixers in phase quadrature. The resulting mixer outputs represent the quadrature modulation components of the received singal, and are applied to low-pass filiters 53 and 54 which attenuate any unwanted high frequency signals. The outputs from filters 53 and 54 are applied to a signal-processing unit 55 which recovers the digital modulation and derives time-slot timimg information, and also detects the level of the received signal. Unit 55 may also include means for equalisation, error detection and error correction. Mixers 56 ands 57 are supplied with a local oscillator at the channel frequency via a 90 degree phase shift unit 58, and are also supplied with appropriate outputs from signal processing unit 55, so as to recreate a replica of the received signal. The other direction of transmission is handled in a similar manner by units 50' to 57' and 26'.

As the GSM mobile radio system has a requirement for frequency hopping, the amplifier units 13 are each provided with means for implementing a hopping sequence. The arrangement is such that the system operator can decide whether or not frequency hopping is to be used. Where it is to be used, the control unit 14 instructed accordingly by the control and signalling channel, and this unit sends appropriate control instructions to the control logic modules 36 of the amplifier units 13. The modules 36 then control their synthesisers 2B, which drive the mixers 21, 21', 25 and 25', to implement the predetermined hopping sequence.

This hopping sequence is controlled by software associated with the base station 1. Each of the mobile units 3 is provided with means for controlling the pattern of frequency hopping for that mobile unit; once instructions are received over the control channel from the base station 1.

We claim:

1. A radio repeater for a frequency band having a plurality of RF channels for carrying a plurality of digital TDMA channels each having a sequence of time slots, comprising:
   a plurality of single RF-channel amplifier units;
   control means for scanning the RF channels to identify an active RF channel and for assigning one of the amplifier units to an identified active channel;
   wherein each of the amplifier units has means for identifying an active time-slot of a TDMA channel, within an active RF channel, and for amplifying digital signals in that time slot.

2. A repreated as claimed in claim 1, wherein each amplifier unit has, for duplex operation, forward and reverse amplifying paths.

3. A repeater as claimed in claim 1 wherein the number of amplifier units is smaller than the number of said RF channels, the amplifier units being of selectable frequency, and the control means being arranged, in use, to select the frequency of each unit for assignment to a traffic-carrying speech channel.

4. A repeater as claimed in claim 3, wherein each amplifier unit has, in each amplifying path, a first frequency changer for converting input signals down to an intermediate frequency, a band-pass filter, and a second frequency changer for converting the filtered signals up to the original frequency, the filter frequency being fixed, and the channel assignment of the unit being controllable by controlling the frequency changer local oscillator frequency.

5. A repeater as claimed in claim 3, wherein each amplifier unit has, in each amplifying path, means for demodulating and regenerating the digital modulating signal and a modulator for recreating a modulated singal at the received frequency using said digital signal.

6. A repeater as claimed in claim 5, wherein digital signal processing techniques are used for any or all of the functions of filtering, demodulation and regeneration, and optically for equalisation of distortion of the received signal.

7. A repeater as claimed in claim 4, wherein the intermediate frequencies for the forward and reverse paths of an amplifier unit differ by an amount corresponding to transmit-receive frequency spacing of the speech channels, whereby a single local oscillator may be used for the unit.

8. A repeater as claimed in claim 1, wherein the control means is common to all the amplifier units.

9. A repeater as claimed in claim 1, wherein the time slot identification means comprises a time slot activity detector for detecting which time slot of a channel is active, a control unit which receives the output of the time slot activity detector, and a time slot gate and power control unit which is controlled by the control unit so as to amplify only an active time slot.

10. A repeater as claimed in claim 9, wherein each amplifier unit further comprises a clock recovery, synchronisation and time slot detector unit for deriving a system clock synchronisation pluses and time slot strobes and applying these to the control unit.

11. A repeater as claimed in the claim 9, wherein the control unit of each amplifier unit includes means for controlling the operating frequency of the enabled amplifier unit to follow a predetermined frequency hopping sequence, thereby allowing the repeater to be used in radio systems which employ frequency hopping 12. A repeater as claimed in claim 11, wherein the frequency control means of a given amplifier unit is effective to control the first and second frequency changers to that amplifer unit.

13. A radio repeater for a frequency band having a plurality of RF channels for carrying a plurality of digital TDMA channels each having a sequence of time slots, comprising:
 a plurality of single RF-channel amplifier units;
 control means for scanning the RF channels to identify an acitve RF channel and for assigning one if the amplifier units to an indentified active channel;
 wherein each of the amplifier units has means for identifying an active time-slot of a TDMA channel, within an active RF channel, and for amplifying digital signals in that time slot, the time-slot identifying means including:
  a time-slot activity detector for detecting which time slot of a channel is active;
  means responsive to the time slot activity detector for amplifying only an active time-slot.

14. A method for operating a radio repeater for a frequency band having a plurality of RF channels for carrying a plurality of digital TDMA channels each having a sequence of time slots, the method comprising:
 scanning the RF channels to identify an active RF channel;
 assigning one plurality of single RF-channel amplifier units to an identified active channel; and,
 using the assigned one of the plurality of single RF-channel amplifier units to identify an active time-slot of a TDMA channel, within an active RF channel, and to amplify digital signals in that time-slot.

* * * * *

UNITED STATES PATENT AND TRADEMARK OFFICE
CERTIFICATE OF CORRECTION

PATENT NO. : 5,200,955
DATED : April 6, 1993
INVENTOR(S) : McFarlane et al.

It is certified that error appears in the above-indentified patent and that said Letters Patent is hereby corrected as shown below:

Column 6, line 11, "repreated" should be --repeater--;

Column 6, line 37, "optically" should be --optionally--;

Column 6, line 68, "to" should be --of--;

Column 7, line 7, "if" should be --of--;

Column 7, line 8, "indentified" should be --identified--;

Column 8, line 9, after "one" insert --of a--.

Signed and Sealed this

Tenth Day of May, 1994

Attest:

BRUCE LEHMAN

*Attesting Officer*     Commissioner of Patents and Trademarks